P. O. GILMOND
Feb. 14, 1933. TOY STORE Re. 18,738
2 Sheets-Sheet 1
Original Filed May 3, 1929
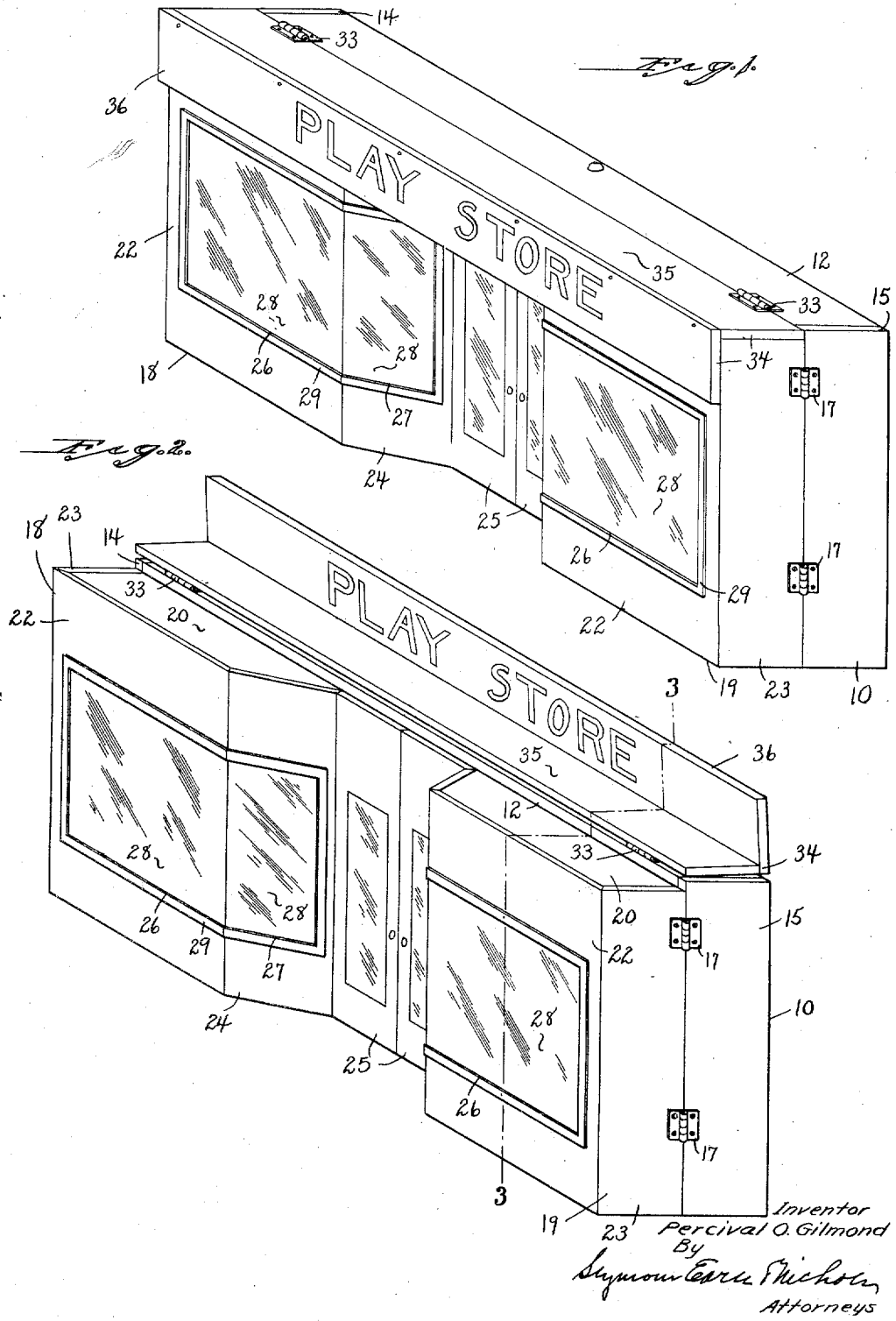
Inventor
Percival O. Gilmond
By
Seymour Earle Nichols
Attorneys

P. O. GILMOND

Feb. 14, 1933. TOY STORE Re. 18,738

2 Sheets-Sheet 2

Original Filed May 3, 1929

Inventor
Percival O. Gilmond
By Symonds Earle & Nichols
Attorneys

Reissued Feb. 14, 1933 Re. 18,738

UNITED STATES PATENT OFFICE

PERCIVAL O. GILMOND, OF HAMDEN, CONNECTICUT

TOY STORE

Original No. 1,787,978, dated January 6, 1931, Serial No. 360,150, filed May 3, 1929. Application for reissue filed December 16, 1932. Serial No. 647,686.

This invention relates to an improvement in toy stores of the type composed of sections hinged one to another and adapted to be folded together to simulate the exterior appearance of a store and unfolded to render shelves, etc. available in simulation of the interior of a store.

The object of this invention is to produce at a low cost for manufacture, a strong and attractive toy of the class referred to, constructed with particular reference to fewness of parts and to securing a close simulation of the exterior of a store without employing complicated and fragile elements.

With this object in view, my invention consists in a toy store having certain details of construction and combinations of parts as will be hereinafter described and particularly recited in the claims.

In the accompanying drawings:

Fig. 1 is a perspective view of a toy store constructed in accordance with my invention and shown as completely folded up;

Fig. 2 is a similar view but showing the L shaped locking-member in its raised position to permit the complementary wing-member to be swung open;

Figures 3, 4:
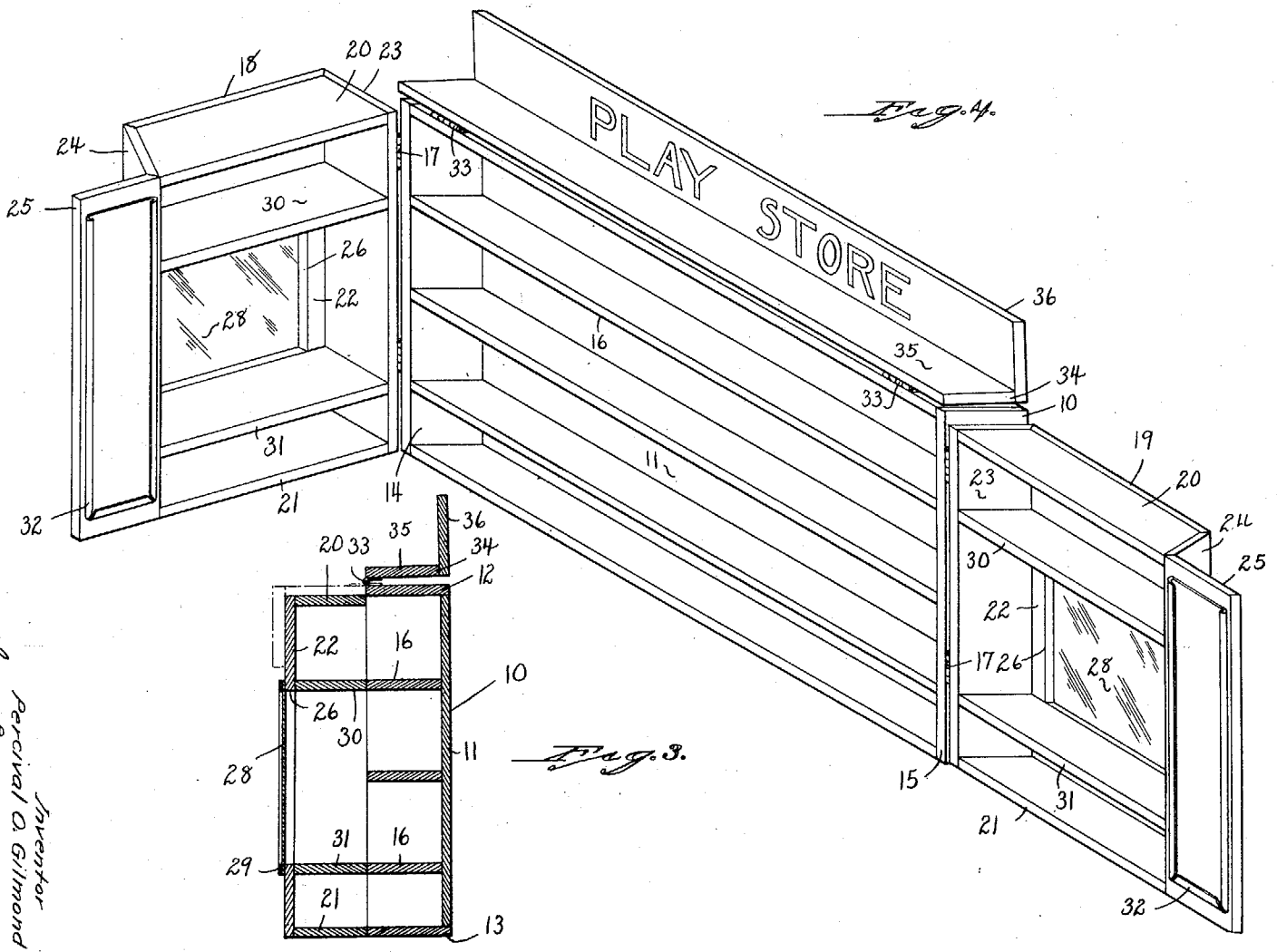
Fig. 3 is a transverse sectional view on the line 3—3 of Fig. 2.
Fig. 4 is a perspective view showing the wing-members of my improved toy store swung open to expose the shelving.

In carrying out my invention, as herein shown, I employ a rectangular box-like central body-member 10, comprising a back 11, top and bottom walls 12 and 13, and end walls 14 and 15, as well as a series of three (more or less) shelves 16.

Secured by hinges 17 to the side walls 14 and 15 respectively of the central body-member 10, are two complementary box-like front or wing-members 18 and 19, of slightly less height than the central member 10, each comprising top and bottom walls 20 and 21; a front plate 22; an outer end wall 23 extending at a right-angle to the front plate 22; an inner end wall 24 sloping with respect to the front wall 22, and an inset door panel 25 paralleling the open forward face of the main body 10 as clearly shown in Fig. 2 of the drawings.

The front plate 22 and inner end wall 24 of each of the complementary box-like front members 18 and 19 are respectively cut away as shown, to provide window openings 26 and 27, both of which are closed by a transparent sheet 28, preferably of celluloid or similar non-fracturable material and retained in place by moulding 29 applied to the front face of the plate 22 and wall 24 aforesaid. The outer faces of each of the adjoining panels 25 are painted or otherwise treated to simulate doors.

The wing-members 18 and 19 are provided with shelves 30 and 31, respectively positioned at the top and bottom of the window openings 26 and 27. The inner face of the door panels 25 are provided with sheet metal holders 32 adapted to interchangeably receive cards which are intended to simulate the advertising posters to be seen in stores.

Secured by hinges 33 to the front edge of the top wall 12 of the central body-member 10 is an L shaped locking bar 34 extending throughout the length of the said body-member 10 and comprising a horizontal plate 35 and a vertical plate 36, the latter carrying upon its respective opposite faces such reading matter as may be desired.

From the foregoing it will be seen that by providing the edge of the front or wing-members 18 and 19 with an inset door panel, that a very natural simulation of an actual store is secured in a simple manner and at a low cost without necessitating the employment of numerous and fragile parts. Furthermore, by employing the L shaped locking bar 34, the same not only holds the front members 18 and 19 in place when the toy is folded up as shown in Fig. 1 but also provides an attractive finish and a convenient place for the display of reading matter and also heightens the realism of the toy.

I claim:

1. A toy of the class described comprising a forwardly opening box-like central body-member; a pair of complementary box-like wing-members respectively hinged to the opposite ends of the said body-member and each provided at its free end with a door-panel inset from its front face and adapted to lie in a plane parallel with the open front face of the said body-member when the said wing-members are folded against the front face thereof; and a member hinged to the top of the central body-member and of sufficient width to overlie and provide a roof for the inset-portions of the said wing-members when the same are in their closed positions.

2. A toy of the class described comprising a forwardly opening box-like central body-member; a pair of complementary box-like wing-members respectively hinged to the opposite ends of the said body-member and each provided at its free end with a door-panel inset from its front face and adapted to lie in a plane parallel with the open front face of the said body-member when the said wing-members are folded against the front face thereof; and a locking member hinged to the top wall of the central body-member and of sufficient width to overlie and provide a roof for the inset-portions of the said wing-members when the same are in their closed positions; and including a vertical plate adapted to extend downward over the upper portions of the respective front faces of the wing-members to hold the same in their closed positions.

3. A toy of the class described comprising a box-like central body-member; a pair of complementary box-like wing-members respectively hinged to the opposite ends of the said body-member; and a locking member hinged to the top wall of the central body-member and including a vertical plate adapted to extend downward over the upper portion of the respective front faces of the wing-members to hold the same in their closed positions.

4. A toy of the class described comprising a box-like central body-member, a pair of complementary box-like wing-members respectively hinged to the opposite ends of the said body-member and of less height than the same; and an L shaped locking member comprising a horizontal plate hinged to the top wall of the central body-member and adapted to cover the tops of the said wing members and a vertical plate adapted to extend downward over the upper portion of the respective front faces of the wing-members to hold the same in their closed positions.

5. A toy store of the class described comprising a forwardly opening box-like body-member; a complementary box-like wing-member hinged to the end of the said body-member and provided at its free end with a door-panel inset from its front face; and a member hinged to the top of the body-member and of sufficient width to overlie and provide a roof for the inset-portion of the said wing-member when the same is in its closed position.

6. A toy store of the class described comprising a forwardly opening box-like body-member; a complementary box-like wing-member hinged to the end of the said body-member and provided at its free end with a door-panel inset from its front face; and a member hinged to the top of the body-member and of sufficient width to overlie and provide a roof for the inset-portion of the said wing-member when the same is in its closed position; and including a plate adapted to extend downward over the upper portion of the front face of the wing-member to hold the same in its closed position.

7. A toy of the class described comprising a box-like body-member; a complementary box-like wing-member hinged to the end of the said body-member; and a locking member hinged to the top of the body-member and including a plate adapted to extend downward over the upper portion of the front face of the wing-member to hold the same in its closed position.

8. A toy of the class described comprising a box-like body-member; a complementary box-like wing-member hinged to the end of the said body-member; and a locking member hinged to the top of one of the members and including a plate adapted to extend downward over the upper portion of the distant face of the other member to hold the members in closed position.

In testimony whereof, I have signed this specification.

PERCIVAL O. GILMOND.